X 955
R. R. CHEROWETH.
Plow.
Patented Nov. 25, 1908
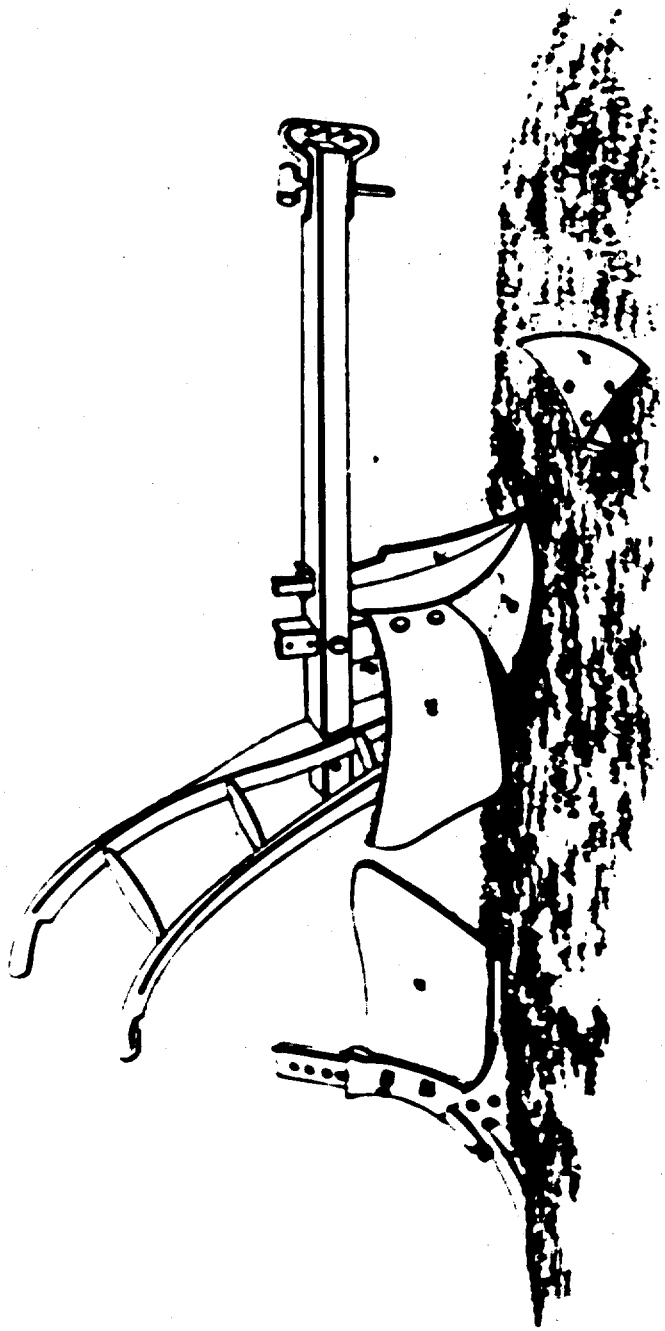

955X

UNITED STATES PATENT OFFICE.

RICHARD B. CHENOWETH, OF BALTIMORE, MARYLAND.

IMPROVEMENT IN PLOWS.

Specification forming part of Letters Patent dated November 25, 1808.

*To all whom it may concern:*

Be it known that I, RICHARD B. CHENOWETH, of Baltimore, in the county of Baltimore and State of Maryland, have invented certain new and useful Improvements in Plows, of which the following is a specification.

The beam handles and sword, all of wood, are nearly similar in their construction to those of the common plow. The landside and mold-board, both of cast-iron, are connected with wrought screws, and there is attached to the upper side of the mold-board a share, which in its shape differs from any other now in practice, it being fastened on the upper side of the mold-board with screws, the point doubling over but running even with the landside, and leaving a hollow under the mold-board, so that small stones will pass without interruption. It is made of wrought-iron whose edge is steeled, and weighing from four to eight pounds, according to the size of the plow.

In Pennsylvania, Maryland, and Virginia, particularly in Maryland, the farmers prefer a plow of the above construction for deep plowing, and its great use is that any number of shares will fit one plow. Besides, it can be kept in repair at less expense than any other.

To the end of the share, but through the beam, the colter is attached, which in its make differs very little from the one commonly used. The clevis varies in its form, according to the fancy of the owner of the plow.

RICHARD B. CHENOWETH.

Witnesses:

RICHARD FORREST,

WILLIAM THORNTON.